Sept. 29, 1970  A. N. EDE  3,530,677
MANHOLES INSPECTION CHAMBERS AND PIPE JUNCTIONS
Filed Sept. 9, 1968  8 Sheets-Sheet 1

INVENTOR
AINSLEY NEVILLE EDE
BY
Watson, Cole, Grindle & Watson
ATTORNEY

Sept. 29, 1970 A. N. EDE 3,530,677
MANHOLES INSPECTION CHAMBERS AND PIPE JUNCTIONS
Filed Sept. 9, 1968 8 Sheets-Sheet 4

INVENTOR
AINSLEY NEVILLE EDE
BY
Watson, Cole, Grindle & Watson
ATTORNEY

Sept. 29, 1970 A. N. EDE 3,530,677
MANHOLES INSPECTION CHAMBERS AND PIPE JUNCTIONS
Filed Sept. 9, 1968 8 Sheets-Sheet 5

INVENTOR
AINSLEY NEVILLE EDE
BY
Watson, Cole, Grindle & Watson
ATTORNEY

United States Patent Office 3,530,677
Patented Sept. 29, 1970

3,530,677
MANHOLES INSPECTION CHAMBERS AND
PIPE JUNCTIONS
Ainsley Neville Ede, 36 Thornton Way,
Cambridge, England
Filed Sept. 9, 1968, Ser. No. 758,481
Claims priority, application Great Britain, Sept. 13, 1967,
41,730/67
Int. Cl. E21d 5/00; E21b 1/02, 9/26
U.S. Cl. 61—41                                       7 Claims

ABSTRACT OF THE DISCLOSURE

A method of making a lined chamber in the ground which comprises boring a hole by means of an earth auger and simultaneously sinking a lining shield into the hole as it is formed, the lining shield resting on a retractible part of the auger, and after completion withdrawing the auger from the hole leaving the shield therein.

---

Figure 1:
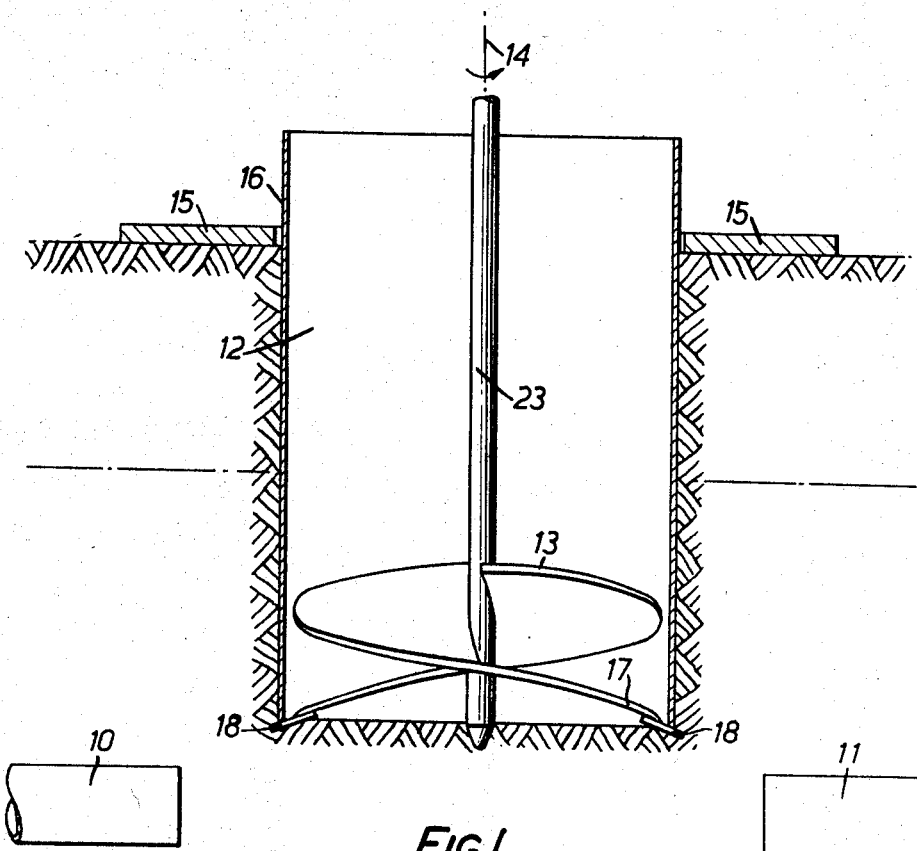

This invention relates to methods and apparatus for use in the manufacture of lined chambers formed in the ground, for example manholes for use as junction boxes and/or inspection chambers at the junctions between adjacent lengths of underground drainage pipe. The invention is also concerned in providing an improved construction of inspection gully at a junction between two runs of drainage pipe, for example at a point where the alignment of the drain changes direction to allow the runs of pipe to be rodded through.

According to one aspect of the present invention, a method of making a lined chamber in the ground comprises boring a hole in the ground by means of an earth auger, and simultaneously sinking a tubular lining shield into the newly-formed hole to line the hole as it is formed, the lining shield resting on a retractible protruding part of the auger and descending into the ground together with the auger, and retracting the protruding part of the auger after completion of the boring of the hole to the required depth and then withdrawing the auger from the hole leaving the shield in position lining the newly-formed hole. The floor and sides of the hole may then be lined with concrete or masonry within the shield, which may be left in position and used as formwork.

The invention thus facilitates the boring of the hole in unstable wet ground, which might otherwise collapse behind the auger before the latter could be withdrawn and any form of shield or lining subsequently inserted.

Moreover, a further feature of the invention is designed to facilitate the use of the auger in water-logged ground, or where it is necessary to bore down below the undisturbed ground water level. In this case the water standing in the boring region may well render the action of the earth auger ineffective and make it impossible to remove soil from the hole, since the auger will merely churn the bottom of the hole into a slurry of mud.

According to this further feature of the invention, water is extracted from the vicinity of the auger blades during the boring of the hole by pumping through a suction nozzle supported on or associated with the lower part of the shield. In this way, the ground in the region of the auger is de-watered simultaneously with the boring operation as the auger descends and a local control of the level of the water table is achieved which, even in highly-permeable soils, facilitates the action of the auger and the removal of soil. Moreover the pumping may be continued through the suction nozzle associated with the shield after the auger has been withdrawn, to facilitate the construction of the concrete or masonry floor and lining of the chamber.

According to a further feature of the invention a junction chamber may be formed between the ends of two adjacent lengths of underground pipes, the junction chamber being formed by forming a lined chamber by the method according to the invention, forming apertures in the wall of the lining shield in alignment with the ends of the pipes which terminate outside and in the vicinity of the shield, fitting extension pipes onto the two pipe ends, which extension pipes protrude through the said apertures into the interior of the chamber, and joining the adjacent ends of the extension pipe within the chamber Preferably an open topped inspection gully is formed as a junction between inner ends of the extension pipes. The inspection gully may be formed by positioning between the extension pipe ends a preformed trough-shaped flashing of sheet material moulded to the required surface form of the gully and embedding the extension pipe ends of the underside of the flashing in a mass of concrete up to the level of the flashing so that the exposed surface of the gully so formed between the pipe ends is afforded by the upper surface of the trough-shaped flashing.

According to another of its aspects the present invention comprises apparatus for forming a lined chamber in the ground, namely the combination of a power-driven earth auger and a cylindrical metal shield surrounding the auger and adapted to rest on retractible supports carried by the auger blades, for example teeth slidably mounted on the auger blades and movable between positions in which they protrude radially beyond the blades to support the shield and withdrawn positions in which they are contained radially within the tips of the blades to allow the auger to pass through the interior of the shield.

As mentioned above, the shield may be formed with a suction nozzle at its lower end for connection to a suction pump. This nozzle may for example comprise an annular double-walled nozzle portion of the shield extending around the whole circumference of the bottom portion of the shield, the walls of the double walled portion being spaced apart and perforated.

A manhole or lined chamber formed by means of the method and apparatus of the invention referred to above may be used as a junction chamber within which a joint may be made between two adjacent runs of underground drainage pipe protruding through the walls of the chamber. The lined chamber may include an open topped inspection fully positioned between the ends of the drainage pipe run, the gully comprising a trough-shaped flashing of sheet material whose lower surface is embedded in concrete filling the lower part of the chamber up to the level of the upper edges of the flashing.

The invention according to another of its aspects comprises a novel method of forming an open-topped inspection gully at the junction between two adjacent runs of drainage pipe which may for example be inclined at an angle to one another.

According to this aspect of the invention, a method of forming an inspection gully between two adjacent runs of drainage pipe comprises positioning between the pipe ends a preformed trough-shaped flashing of sheet material moulded to the required surface form of the gully, and embedding the pipe ends and the underside of the trough-shaped flashing in a mass of concrete up the the level of the top of the flashing, so that the exposed surface of the gully so formed is afforded by the surface of the trough-shaped flashing.

In this way the handling and trowelling of concrete to the required three-dimensional form of the gully, as is necessary in the conventional construction of a concrete gully, is entirely obviated since the surface of the gully is defined by the pre-formed trough, which may be conveniently made as a flashing of moulded sheet plastics material.

The novel gully construction of this aspect of the invention may conveniently be incorporated in a pipe junction formed in a lined chamber constructed in accordance with the first aspect of the invention by means of an earth auger and descending shield; however the novel gully construction is equally applicable in conventional pipe junction boxes constructed of brick, masonry or concrete.

Figure 2:
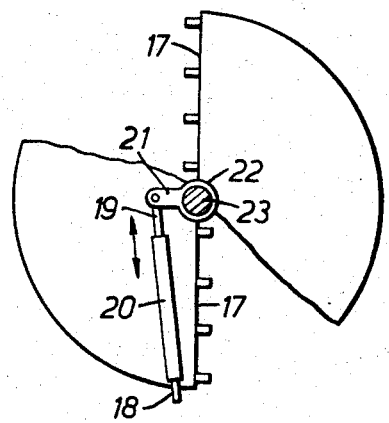
Figure 2A:
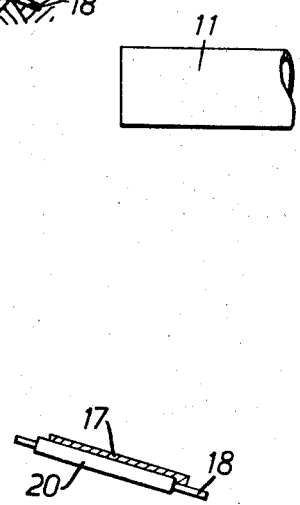
Figure 3:
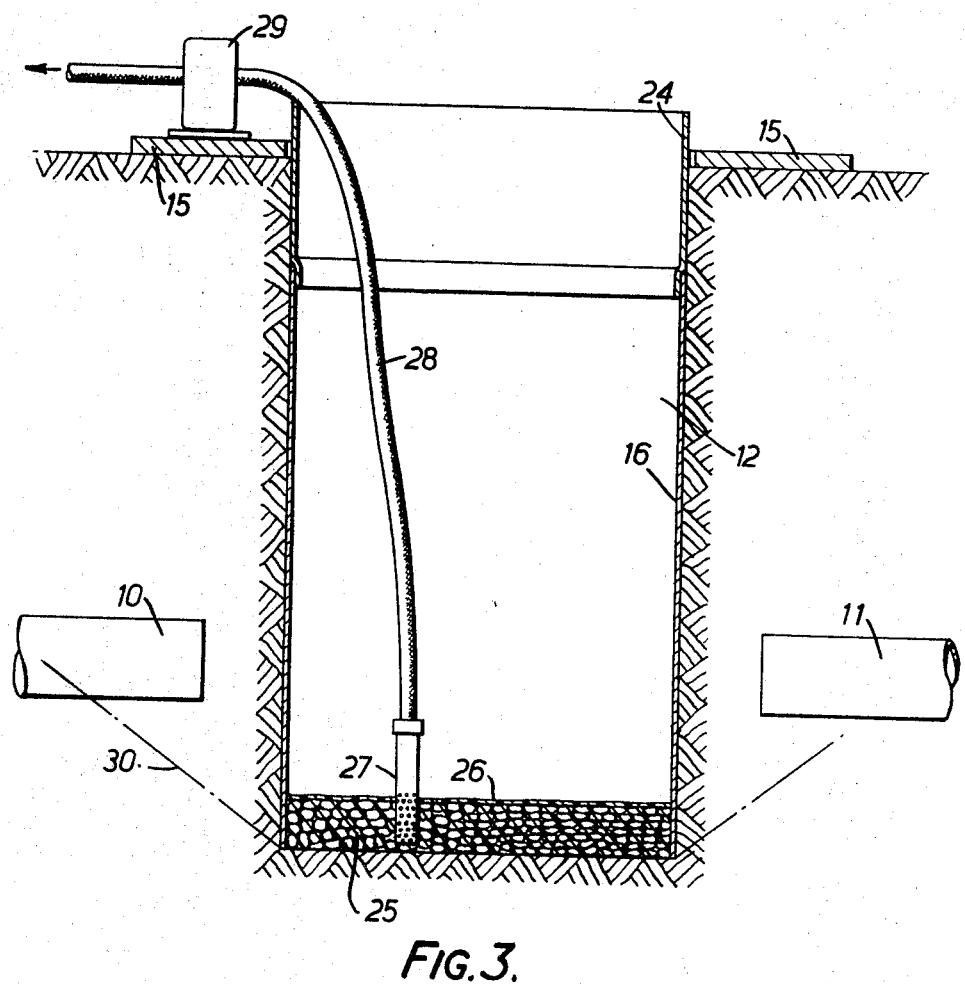
Figure 4:
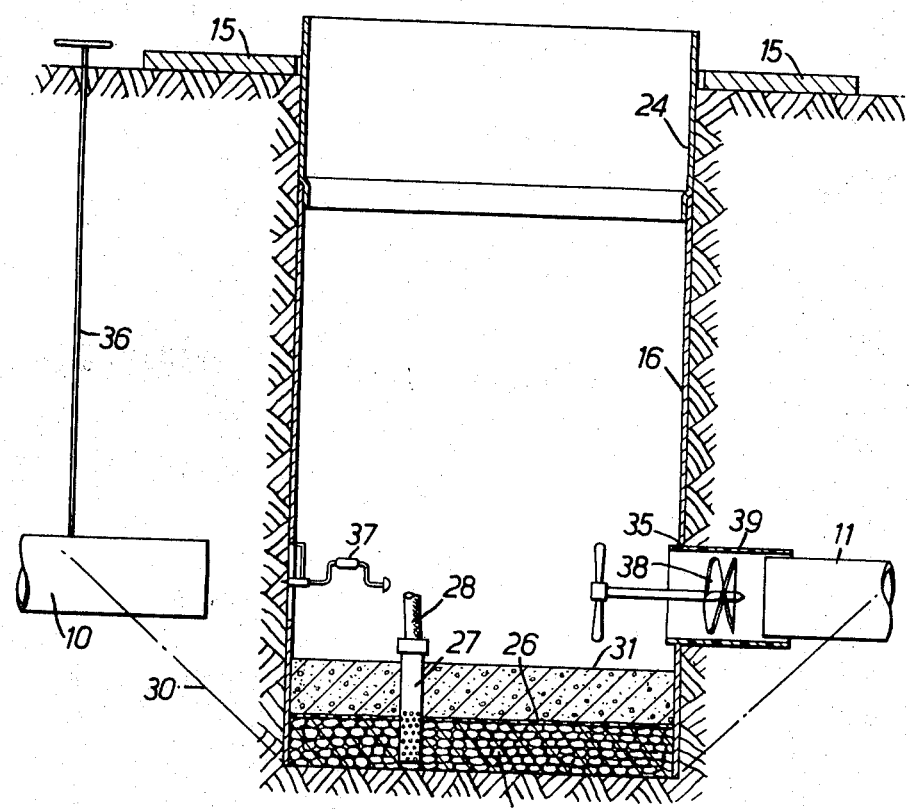
Figure 5:
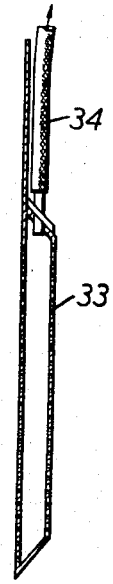
Figure 6:
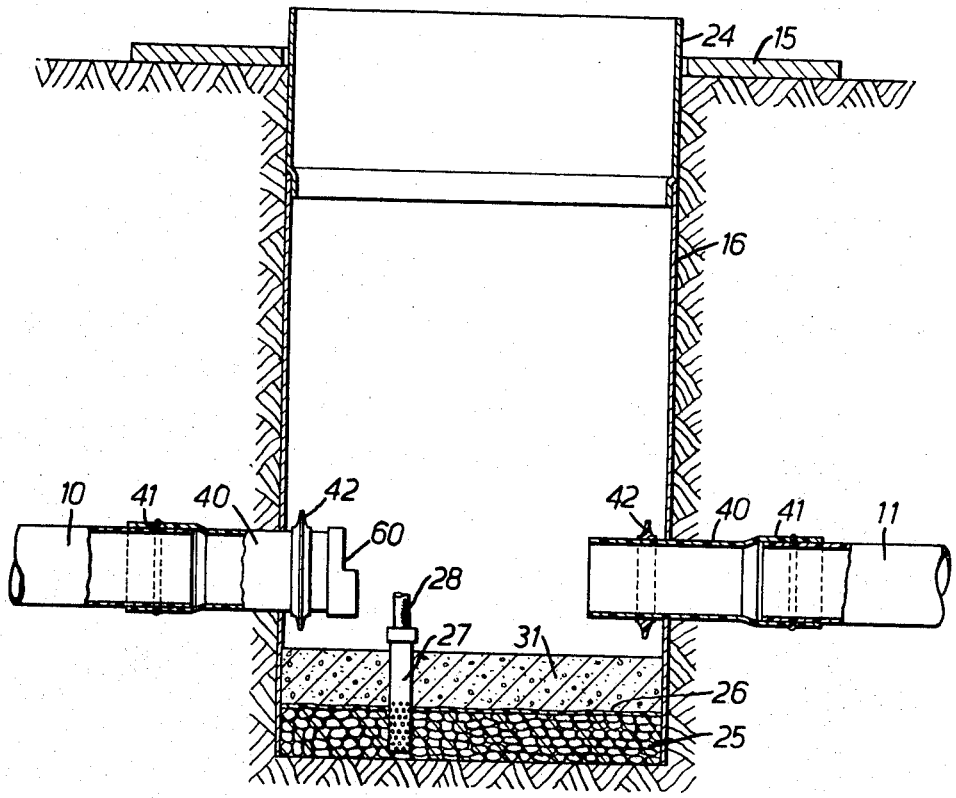
Figure 6A:
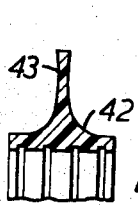
Figure 7:
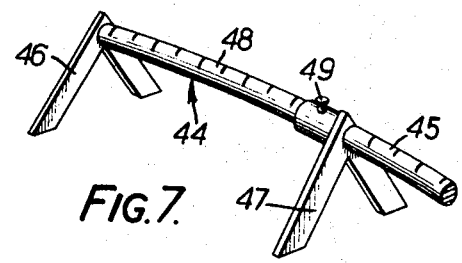
Figure 9:
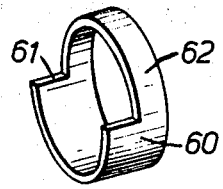
Figure 8:
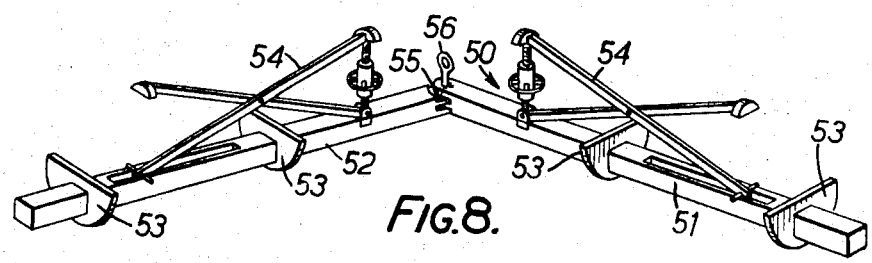
Figure 10:
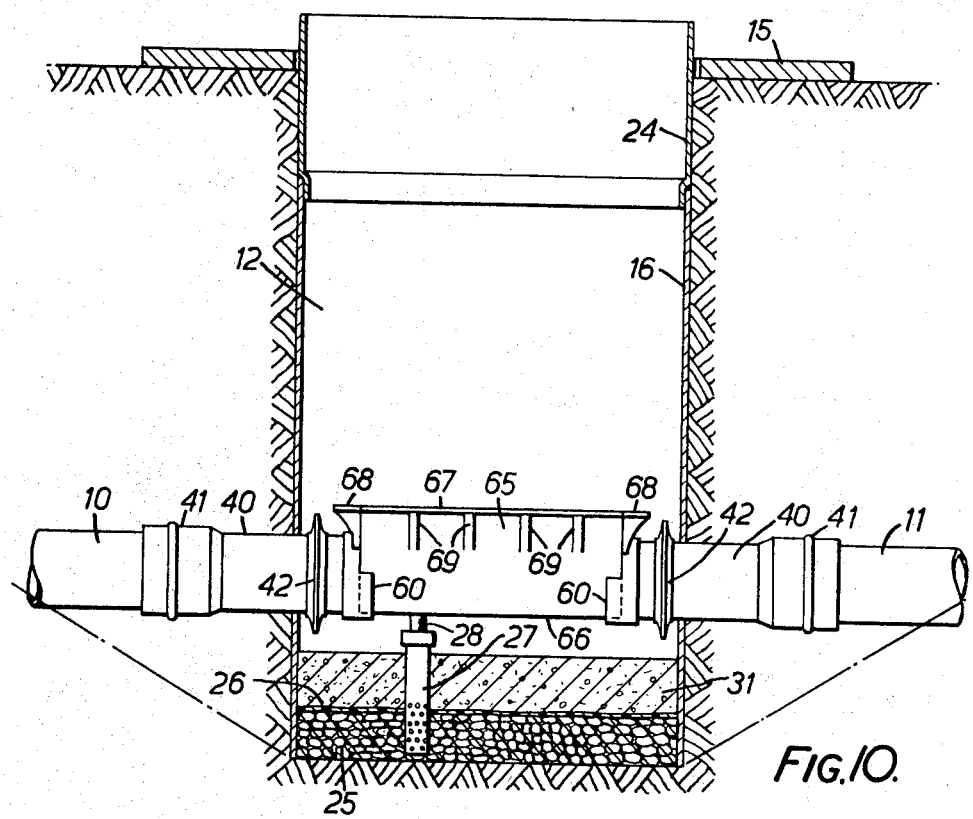
Figure 11:
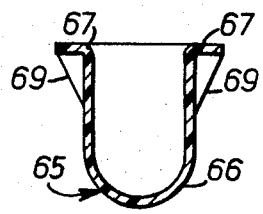
Figure 11A:
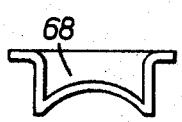
Figure 11B:
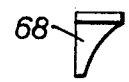
Figure 12:
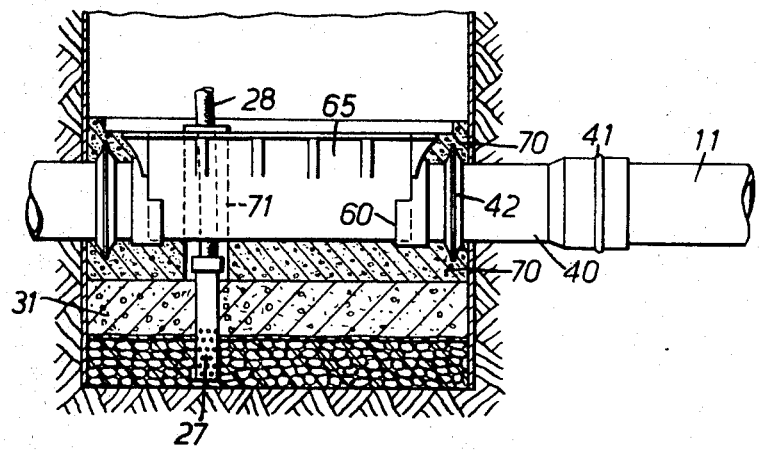
Figure 13:
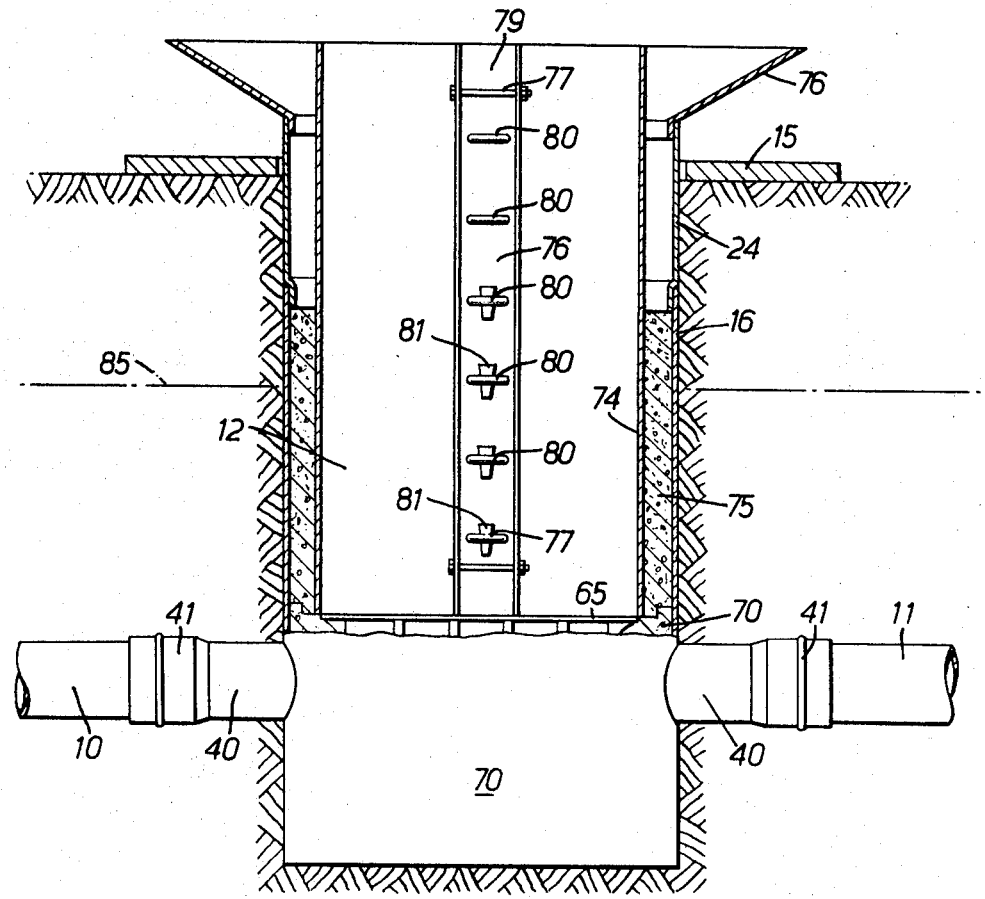
Figure 13A:
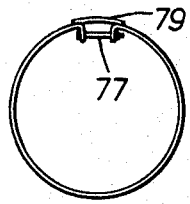
Figure 13B:
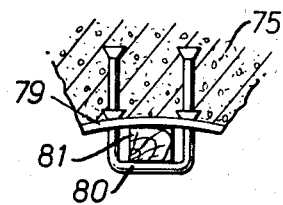
Figure 14:
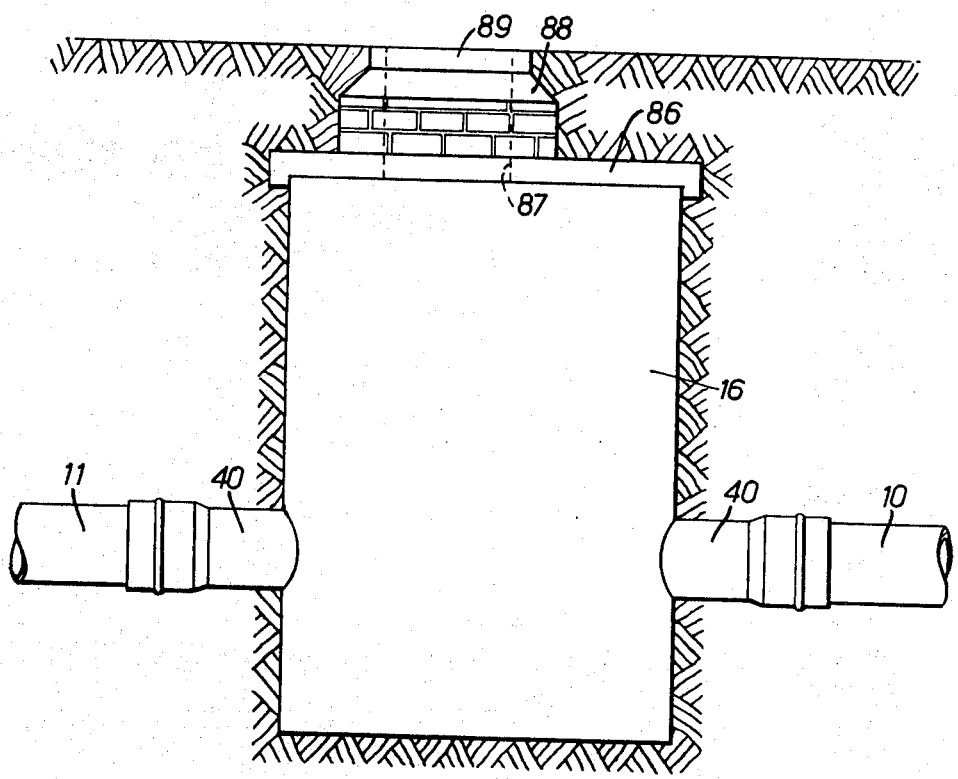

The invention may be carried into practice in various ways, but certain specific embodiments will now be described by way of example with reference to the accompanying drawings, in which, FIG. 1 is a diagrammatic sectional elevation showing the initial stage of the forming of a manhole to constitute a junction chamber between the ends of two underground pipe lengths, FIG. 2 is a fragmentary plan view of the earth auger used for boring the hole, FIG. 2A is a fragmentary view showing in elevation one of the retractible teeth protruding from the tips of the auger blades, FIG. 3 is a view similar to FIG. 1 showing the stage of de-watering the hole after boring, FIG. 4 is a view similar to FIG. 3 showing the formation of a concrete working floor and pipe access apertures in the de-watered hole, FIG. 5 is a view showing a modified form of liner shield which may be used instead of the shield 16 shown in FIGS. 1, 3 and 4, FIG. 6 is a view similar to FIG. 4 showing the placing of the terminal collars and fittings on the pipe ends, FIG. 6A is a sectional part view of the sealing ring extending around a terminal collar, FIG. 7 is a perspective view of a marking device used to mark off the terminal collars for cutting, FIG. 8 is a perspective view of a pipe aligner device for aligning the pipe ends protruding into the newly-formed hole, FIG. 9 is a perspective view of one of the half-sockets for attachment to the pipe ends, FIG. 10 is a view similar to FIG. 6 showing the fitting of the gully flashing, FIG. 11 is a cross-sectional view of the gully flashing, FIG. 11A is an end view and FIG. 11B is a side view of one of the end fillets for the gully flashing, FIG. 12 is a detailed view of the lower part of the lined manhole showing the gully flashing in its finished position embedded in a concrete filling, FIG. 13 is a view similar to FIG. 10 and showing the concrete lining of the manhole and its internal shuttering, FIG. 13A is a diagrammatic section on a smaller scale through the internal shuttering, FIG. 13B is a detailed view on an enlarged scale of one of the U-shaped hand-holds wedged in position in the step retainer, with its legs embedded in the concrete lining, and FIG. 14 is a view of the finished manhole complete with its cover and access hatch.

In this embodiment the invention is applied to construction of a lined manhole chamber at a junction between adjacent ends of two lengths of underground drainage pipe 10 and 11 whose directions are inclined to one another. In this case the pipe runs 10 and 11, which may each be over 300 feet in length, are formed of flexible extruded plastics drainage pipe drawn into previously-formed underground tunnels prepared by means of a mole plough.

In this example each plastics pipe length 10 and 11 is 320 feet long, and is drawn into position in the underground tunnel newly-formed by the mole plough by means of a winch cable extending within the tunnel.

Each pipe length is drawn accurately into its required final position in which its rear end is 8 feet ahead of the leading end of the preceding pipe length, measured along the drainage alignment, and is then released from the winch cable. Markers are placed above ground at the centres of the manholes required to be formed at the leading and rear ends of each pipe length, these markers being 328 feet apart and each being 4 feet from the adjacent end of the pipe length.

A cylindrical manhole is now constructed centred on each marker, in the following manner. Referring to FIG. 1, a cylindrical hole 12 5 feet in diameter is bored in the soil by means of a power-driven earth auger 13, the hole 12 having its axis 14 vertical and centred on the marker.

A circular duckboard 15, which may be formed in two semi-circular portions, is preferably placed on the ground around the location of the hole 12 before boring starts, to provide a firm footing for the auger operator, and is kept in place throughout the construction of the manhole. Simultaneously with the boring of the hole 12, a cylindrical liner shield 16 made of 14 S.W.G. sheet metal is progressively lowered into the hole 12 as it is formed, the liner shield 16 being slightly greater in diameter than the auger cutting blades 17 and resting on a set of three retractible teeth 18 which underlie and rotate with the auger blades 17. The retractible teeth 18 normally project outwardly slightly beyond the auger blades 17, as shown in FIGS. 2 and 2A, to support the shield 16 during the boring operation. Each of the retractible teeth 18 is mounted on the outer end of a connecting rod 19 slidably mounted in a sleeve 20 secured to the underside of one of the auger blades 17, the inner end of the rod 19 being pivoted to a crank 21 on a rotatable collar 22 journalled on the auger shaft 23. Rotation of the collar 22 relatively to and on the auger shaft 23 through a limited angle can be effected by means of a mechanism (not shown) operable from above ground, to cause the projection or withdrawal of the teeth 18. The maximum projection of each tooth 18 beyond the auger blades 17 is 2 inches, and its total retraction distance is 3 inches. During the progressive boring of the hole 12 the shield 16 rests on the projecting teeth 18 and rotates with the auger 13, so that the rotating shield 16 sinks progressively into the hole 12 as it is formed by the auger and prevents the sides of the newly-formed hole from caving in above the auger blades as boring continues. When each stage of the boring operation has been completed, the teeth 18 are retracted clear of the lower edge of the shield 16 to allow the auger 13 to be withdrawn from the hole 12, together with spoil resting on its blades 17, and leaving the shield 16 in position lining the hole 12.

The axial height of the sheet metal liner shield 16, which is an expendible part, is about 2 feet less than the total depth of the hole 12, in order to allow the manhole to be completed by means of a conventional cover as will be described below. During the latter stages of the boring operation when the top of the shield 16 sinks below ground level, a temporary extension sleeve 24, as shown in FIG. 3, of sheet metal is removably fitted onto the upper end of the shield 16 to retain the soil at the top of the hole, the extension sleeve 24 being kept in position until the manhole is ready for covering.

When the boring of the hole 12 in the soil is complete and the auger 13 has been withdrawn, leaving the hole 12 lined by the shield 16 and its temporary extension sleeve 24, a layer of hardcore 25 is placed in the bottom of the hole and is overlaid by a sheet of plastics material 26, through which a suction nozzle 27 extends down into the hardcore as shown in FIG. 3. The upper end of the suction nozzle 27 is connected to a suction hose 28 which leads to a suction pump 29 above ground. The pump 29 is operated continuously during the succeeding stages of construction of the manhole to remove excess water, since it is frequently necessary to bore the auger hole 12 to a depth below the undisturbed ground water level. The operation of the suction pump 29 to remove excess water from the vicinity of the bottom of the hole 12 enables the water level to be depressed locally, as indicated by the chain line 30, to an extent which will be sufficient, in soils of low or medium permeability, to keep the bottom of the hole 12 drained during the subsequent construction operations. A concrete working floor 31 is now laid on top of the plastics sheet 26 at the bottom of the hole 12, as shown in FIG. 4, and is allowed to harden, the suction nozzle 27 being embedded in the concrete floor 31 and protruding through it into the permeable hardcore foundation 25. The suction hose 28 is detachably connected to the upper end of the nozzle 27 above the concrete floor 31.

In soils of high permeability, however, difficulty may be experienced in completing the boring operations at levels below the undisturbed ground water level, on account of the excess ground water at the bottom of the hole. To overcome this difficulty a modified form of shield 16A may be employed which as shown in FIG. 5 is formed at its lower end with a double-walled annular perforated foot portion 33, about 1 inch in radial width and 12 inches high, constituting an annular suction nozzle whose interior is connected to the suction pipe 34 extending upwardly and connectible above ground to the suction pump 29. The boring operation may be performed with the shield 16A resting on the retractible auger teeth 18 as before, and with the suction pump 29 operating continuously to withdraw excess water from the bottom of the hole via the perforated foot 33 and pipe 34 of the shield 16A. In this way the earth at the foot of the hole 12 is stabilised by removal of excess water whilst it is being subjected to boring by the auger 13, and the removal of spoil from the hole is facilitated. The suction pump 29 is maintained in continuous operation thereafter, connected to the perforated foot 33 of the shield, to control the local ground water level during the subsequent stages of construction of the manhole.

With the boring completed and the shield 16 (or 16A) still in position in the hole 12, it is necessary to form access holes in the side of the shield leading to the buried drainage pipe ends. For this purpose a circular aperture 35 is cut in the wall of the shield 16 opposite the end of each drainage pipe 10 or 11, the precise position and depth of each aperture 35 being determined with the aid of a probe rod 36 which is pushed down through the soil to locate the drainage pipe in its tunnel. The apertures 35 in the shield are cut by means of a hand-operated trepanning tool 37, and the soil is removed by means of a hand auger 38 behind each such aperture 35 to open up the tunnels leading to the pipe ends 10 and 11. If necessary small horizontal cylindrical shields 39 are inserted temporarily into these tunnels to held them open. A spoil collector tray having an arcuate convex edge dimensioned to confirm to the circumferential inner surface of the shield is used to collect the spoil removed from each of these tunnels by the hand augers 39.

A terminal collar 40 comprising a short length of extruded plastics tube having a slightly-expanded end socket 41 at its outer end is now inserted into each of the tunnels and pushed over the exposed end of the drainage pipe 10 or 11, a sealing ring being located in a circumferential groove inside the socket end 41 to seal each terminal collar 40 to the pipe end. The inner end of each fitted terminal collar 40 projects inwardly within the interior of the main metal shield 16 (or 16A), and is fitted with an external T-section resilient sealing ring 42 having a radially-outwardly-directed flange 43 (FIG. 6A). The two inwardly-projecting ends of the terminal collars 40 are cut off at positions determined by the angle between the axes of the two drainage pipe lengths 10 and 11, the terminal collars 40 being marked for cutting off with the aid of a marking-off device 44 shown in FIG. 7 and comprising an arcuate bar 45 whose radius corresponds to the desired radius of curvature at the drainage pipe junction, the bar 45 having a fixed bracket 46 at one end and a sliding bracket 47 slidably mounted on it, and being marked with a scale of degrees 48. The sliding bracket 47 is set to the scale angle corresponding to the required radius of curvature of the junction, and is locked by means of a locking nut 49, and the device 44 is then applied between the protruding terminal collar ends 40 and is used as a guide for a marking-off scriber.

A hinged pipe aligner device 50 shown in FIG. 8 is now employed to force the drainage pipe ends 10 and 11 into alignment. This device 50 is formed in two halves 51, 52 releasably hinged together. Each half 51 or 52 of the aligner device 50 is provided with semi-circular pipe guides 53 and with a screw jack 54 and can be inserted separately through one of the terminal collars 40 into the associated drainage pipe and jacked up against the concrete floor 31 or the wall of the main shield 16 (or 16A), until it can be attached at the hinge 55 to the other half 52 or 51 by the insertion of the hinge pin 56, indicating the alignment of the two pipes 10 and 11. The positions of the two aligned pipes 10 and 11 are secured by means of wedges driven between the terminal collars 40 and the edges of the shield apertures 35, after which the alignment device 50 is removed. A half socket 60 shown in FIG. 9 is now solvent-welded into the inner end of each terminal collar 40 to receive and support an inspection gully flashing. Each half socket 60 as shown in FIG. 9 comprises a short length of extruded plastics pipe, one end portion of which is cut away at 61 around half of its circumference to channel form, and the other end of which is a complete annulus 62 for welding to the terminal socket 40.

A preformed longitudinally-curved gully flashing section or trough 65, formed of blow-moulded polyvinyl chloride, is now laid in the two half sockets 60 as shown in FIG. 10 to bridge the gap between them. The lower part 66 of the gully flashing 65 is semi-circular, as shown in FIG. 11, being of the same internal radius as the drainage pipes 10 and 11 and terminal collars 40, and the upper part comprises a pair of upwardly-protruding and outwardly rolled lis or wings 67. The gully flashing 65 is moulded in lengths of 4 foot and 8 foot radius, from which the appropriate length is cut off to fit the particular job. End fillets 68 which are semi-circular in plan view and corresponding in side and end elevation (FIGS. 11A and 11B) to the upper part of the gully, are provided for closing the ends of the upper part of the gully flashing section 65 between its outwardly-rolled side wings 67 when it has been positioned between the half sockets 60, and side fillets 69 are fitted below the side wings 67 to support them. When the gully flashing 65 has been completely fitted and its joints waterproofed, the entire bottom of the hole 12 below the gully flashing 65 and within the shield 16 (or 16A) is filled with bulk concrete 70 up to the level of the top of the gully flashing 65 as shown in FIG. 12, a vertical passage 71 being formed in the concrete filling 70 leading to the upper end of the suction nozzle 27 to receive the suction hose 28. The use of a preformed moulded plastics gully flashing section 65 to form the lining of the inspection gully, backed by a bulk concrete filling 70, obviates the need for trowelling a shaped gully surface in concrete as is done when forming a conventional concrete inspection gully.

The sides of the manhole are now built up, either by dropping preformed concrete rings into the metal shield 16 (or 16A) to rest on the filling concrete 70 around the gully 65, or by inserting internal cylindrical shuttering 74 of sheet metal inside the main shield 16, and filling the annular gap between the shield and the shuttering with concrete 75 up to the level of the top of the shield, as shown in FIG. 13. To facilitate the pouring of this concrete 75, a funnel 76 is attached to the top of the extension sleeve 24 on the shield 16. The internal shuttering 74 is longitudinally-split at 76 (FIGS. 13 and 13A) and is provided with bolts 77 by which it may be tightened at the split to contract it for easy removal when the concrete 75 has hardened. The gap between the edges of the split 76 in the shuttering 74 is closed by a metal strip 79 constituting a step retainer, by which steps 86 are moulded in the concrete. The step retainer also supports U-shaped iron hand-holds 80 (FIG. 13B) whose ends are embedded in the concrete 75, the hand-holds 80 being retained by wedges 81 fixed between their yokes and the step retainer 79. Reinforcement in the form of a cylinder of metal mesh can be incorporated in the concrete lining 75 of the hole 12 if desired.

Once the concrete of the hole gully filling and shield lining has set sufficiently, the suction pumping may be stopped and the suction hose 28 removed from its embedded nozzle 27 in the floor of the hole, the access hole 71 in the concrete filling 70 being closed by means of a suitable plug. The ground water level will revert to its normal level at 85 around the hole once the pumping has been stopped. The embedded suction nozzle 27 remains available for connection to a pump in case it is necessary to pump out the hole and lower the ground water level locally, for inspection or maintenance purpose during the service life of the drainage system.

Finally, the funnel 76 and the upper extension sleeve 24 are removed from the top of the metal shield 16 (or 16A) and a reinforced concrete cover plate 86 formed with an access hatch 87 is placed in position on the top of the liner shield 16 to close the manhole. The metal shield 16 is left in place, being an expendable item. The access hatch is built up to ground level with a brickwork enclosure 88 on the cover plate 86, and is provided with a conventional hatch door 89, and the remainder of the manhole cover plate 86 is covered over with spoil to ground level.

What I claim as my invention and desire to secure by Letters Patent is:

1. A method of making a lined chamber in the ground, which comprises boring a hole in the ground by means of an earth auger, and simultaneously sinking a tubular lining shield into the newly-formed hole to line the hole as it is formed, the lining shield resting on a retractable protruding part of the auger and descending into the ground together with the auger, and retracting the protruding part of the auger after completion of boring of the hole to the required depth and then withdrawing the auger from the hole, leaving the shield in position lining the newly-formed hole.

2. A method as claimed in claim 1 including the step of building a concrete or masonry floor and sides in the hole within the interior of the shield.

3. A method as claimed in claim 1 which comprises extracting water from the vicinity of the auger blades during the boring of the hole by pumping through a suction nozzle located adjacent to the lower part of the shield.

4. A method as claimed in claim 3 in which the water extraction by pumping is continued through the suction nozzle after the auger has been withdrawn.

5. A method as claimed in claim 1 wherein said lining chamber is located between the ends of two adjacent lengths of underground pipe comprising the additional step of forming apertures in the wall of the lining shield in alignment with the ends of the pipes which terminate outside and in the vicinity of the shield, fitting extension pipes onto the two pipe ends, which extension pipes protrude through the said apertures into the interior of the chamber and joining the adjacent ends of the extension pipes within the chamber.

6. A method as claimed in claim 5 which includes the step of forming an open-topped inspection gully as a junction between the inner ends of the extension pipes.

7. A method as claimed in claim 6 in which the method of forming the inspection gully comprises positioning between the extension pipe ends a preformed trough-shaped flashing of sheet material moulded to the required surface form of the gully, and embedding the extension pipe ends and the underside of the flashing in a mass of concrete up to the level of the flashing, so that the exposed surface of the gully so formed between the pipe ends is afforded by the upper surface of the flashing.

References Cited
UNITED STATES PATENTS

| | | | |
|---|---|---|---|
| 374,458 | 12/1887 | Davis | 52—20 X |
| 428,021 | 5/1890 | Rothwell | 61—41 X |
| 898,013 | 9/1908 | Skinner | 61—53.52 |
| 932,717 | 8/1909 | O'Rourke | 61—50 |
| 1,104,703 | 7/1914 | Phillips | 61—53.52 |
| 1,931,845 | 10/1933 | Hart et al. | |
| 2,658,352 | 11/1953 | Haeg et al. | 175—171 X |

DENNIS L. TAYLOR, Primary Examiner

U.S. Cl. X.R.

61—53.5, 53.52; 166—50; 175—171, 263